(No Model.)  3 Sheets—Sheet 1.
J. D. WHIPPLE.
VEHICLE SPRING.
No. 440,093.  Patented Nov. 4, 1890.
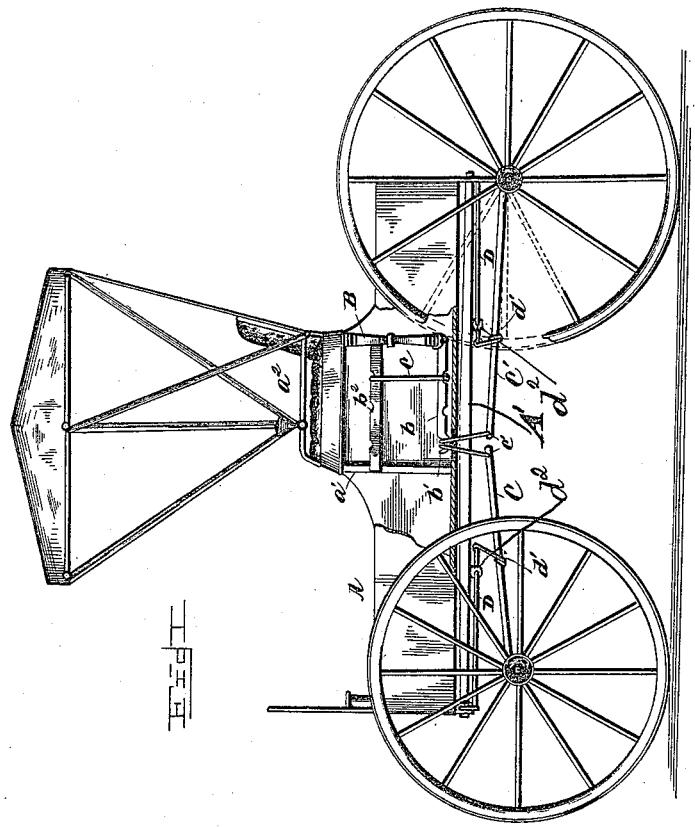
Witnesses
Paul W. Stevens
Mercer Myers
Inventor
John D. Whipple
By Myers & Co.
Attorneys (No Model.) 3 Sheets—Sheet 2.
J. D. WHIPPLE.
VEHICLE SPRING.
No. 440,093. Patented Nov. 4, 1890.
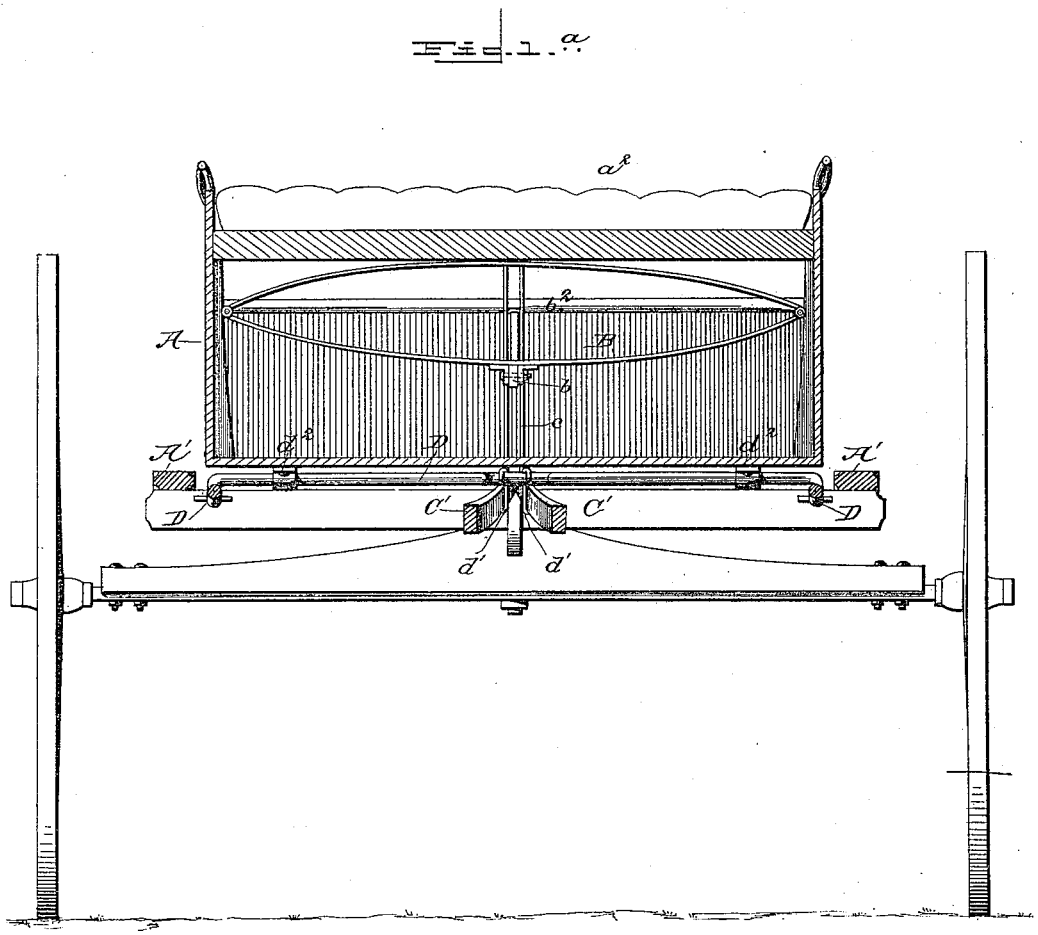
WITNESSES
INVENTOR (No Model.) 3 Sheets—Sheet 3.
J. D. WHIPPLE.
VEHICLE SPRING.
No. 440,093. Patented Nov. 4, 1890.
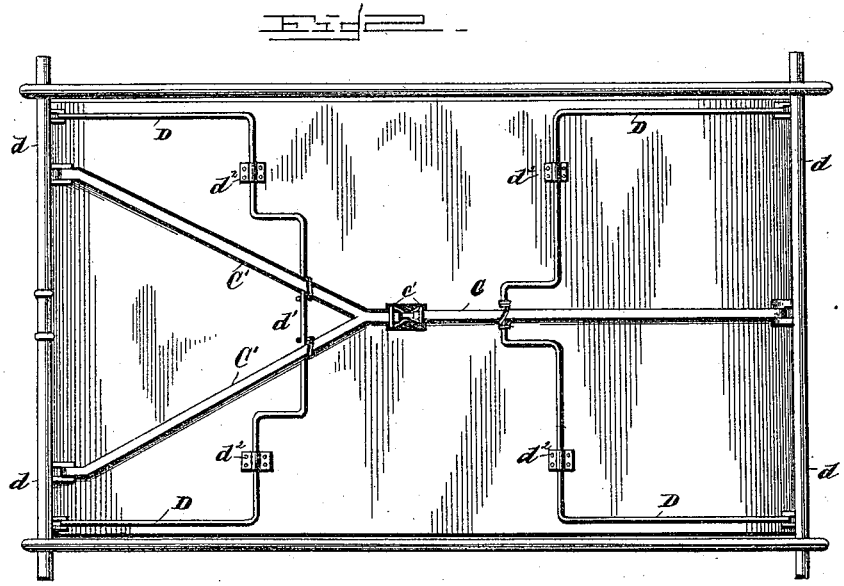
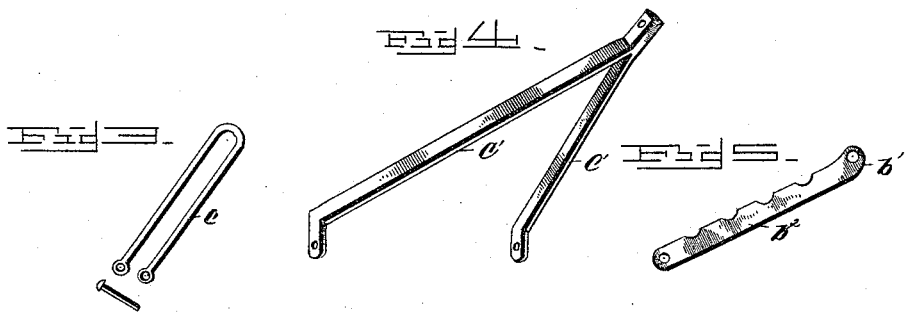
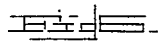
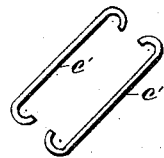
Witnesses
Paul H. Stevens
Mercer Myers
Inventor
John D. Whipple
By Myers & Co.
Attorneys

UNITED STATES PATENT OFFICE.

JOHN D. WHIPPLE, OF EXCELSIOR SPRINGS, MISSOURI, ASSIGNOR OF ONE-HALF TO ALBERT P. CAMPBELL AND WILLIAM E. FORD, BOTH OF SAME PLACE.

VEHICLE-SPRING.

SPECIFICATION forming part of Letters Patent No. 440,093, dated November 4, 1890.

Application filed May 12, 1890. Serial No. 351,485. (No model.)

*To all whom it may concern:*

Be it known that I, JOHN D. WHIPPLE, a citizen of the United States of America, residing at Excelsior Springs, in the county of Clay and State of Missouri, have invented certain new and useful Improvements in Vehicle-Springs, of which the following is a specification, reference being had therein to the accompanying drawings.

My invention pertains to an improvement in vehicle-springs; and it consists in the novel construction and combination of the parts, as hereinafter more fully shown and described.

In the accompanying drawings, Figure 1 is a side elevation, partly in section and partly broken away, of my improvement as applied for use. Fig. 1$^a$ is a cross-sectional view, and Fig. 2 is an inverted plan view thereof. Figs. 3, 4, 5, and 6 are detail views of the same.

In the embodiment of my invention I employ the ordinary vehicle-body A and the vertical seat-supporting uprights $a'$ $a'$, on which is disposed seat $a^2$, secured to said body. Having its upper side bearing against and secured to the rear under side of seat $a^2$ is an elliptic spring B, extending transversely across the body of the vehicle and having its lower side elevated from the bottom of said body.

Pivotally connected to the center of the lower side of spring B is notched bar $b$, having on its outer end a hook or eye $b'$, and vertically aligned above said bar is a corresponding notched bar $b^2$, secured rigidly to the under side of seat $a^2$, the bars $b^2$ and $b$ being connected by adjustable clevis or link $c$.

Connected to the hooked end $b'$ of bar $b$ by means of hooks or links $c'$ $c'$, passing through an opening in the bottom of the body A, are levers C C′, inclining from the center toward the axles, where they are pivotally secured in any ordinary manner.

D D are bails or frames, having their outer ends pivotally connected to the end bars of the body-carrying frame A′, said bails being fulcrumed in eyes or staples $d^2$, depending from the under side of the body A. Upon these levers rest and to them are secured or connected the inner looped ends $d'$ of the bails or frames D D.

Thus constructed it will be seen that my improved vehicle-springs may by a little alteration be adapted to any kind of vehicle and be adjusted as to strength from the vehicle at the will of the rider by simply moving link $c$ in the desired direction on notched bars $b$ and $b^2$—that is, toward the hooked end on bar $b$ to strengthen the spring and in the opposite direction to weaken it.

Thus constructed a highly efficient, durable, and adjustable vehicle-spring is produced which is comparatively inexpensive.

Having thus fully described my invention, what I claim, and desire to secure by Letters Patent, is—

The vehicle-spring comprising the bails or frames having their outer ends connected to the end bars of the body-carrying frame and fulcrumed upon the body, the levers pivoted to the axle and having secured thereon said bails or frames, the elliptical spring secured to the under side of the seat rigidly connected to the body, and the notched fixed bar and notched lever pivoted at one end to the under side of the elliptical spring and linked to said notched bar and to the inner ends of the said bails or frames, substantially as set forth.

In testimony whereof I affix my signature in presence of two witnesses.

JOHN D. WHIPPLE.

Witnesses:
JAMES H. DALE,
W. P. WRIGHT.